Patented Dec. 27, 1927.

1,653,933

UNITED STATES PATENT OFFICE.

FREDERICK W. SPERR, JR., AND DAVID L. JACOBSON, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

GAS-PURIFICATION PROCESS.

No Drawing.   Application filed May 19, 1925.   Serial No. 31,457.

This application is directed to the alternative method referred to in, and is a continuation in part of, our prior co-pending application Serial No. 462,309, filed April 18, 1921, renewed August 22, 1924, for process producing alkali-metal carbonates, now Patent 1,542,971.

This invention relates to the removal of hydrogen sulphide from gases by bringing such gases into contact with a liquid medium which may be continuously regenerated by aeration; the invention has for its object to provide for the regeneration of the secondary products of aeration that are inert with respect to the hydrogen sulphide and that cannot, without such regeneration, play any part in its removal. In the co-pending application, Serial No. 458,265 of Frederick W. Sperr and David L. Jacobson, there is described a process for the manufacture of alkali-metal thiosulphates in which gas, containing hydrogen sulphide, is brought into contact with an alkaline solution which is continuously circulated and aerated. The present invention contemplates the application of such a process to the substantially complete conservation of the alkali, by providing for the regeneration of the thiosulphate formed in the purification process, such regeneration converting the thiosulphate principally to carbonate, which may be employed for making up the alkaline solution used for treating the gas.

The gases, such as coke oven gas, water gas, and other gases, to which this process is commonly applicable, usually contain $CO_2$ which is a useful agent in the process. If, however, the gases do not originally contain $CO_2$, it may either be added artificially or else gases containing $CO_2$, such as waste stack gas, may be used in the treatment of the solution to produce the requisite amount of sodium bicarbonate.

In addition to the general objects recited above, the invention has for further objects such other improvements and advantages in operation and result as are found to obtain in the process hereinafter described and claimed.

According to this invention, in the purification of gases, the gas is treated by a cyclic process in which the gas is washed by an alkali-metal carbonate solution, such as a sodium carbonate solution, which passes cyclically back and forth through a gas washing stage and through an aeration stage, the latter involving the formation of alkali-metal thiosulphate, such as sodium thiosulphate, in the solution, such matter being more specifically set forth in our Patent 1,542,971 referred to first above. The sodium carbonate is recovered from such solutions and returned to the gas purifying stage and the alkali-metal (sodium) thiosulphate recovered, as described more particularly in the co-pending application Serial No. 462136 of Hall & Jacobson; and treated as hereinafter set forth. Briefly stated, said application Ser. No. 462,136 describes a process of purifying a gas purifying sodium carbonate solution including thiosulphate by heating and concentrating a spent portion of said solution at a temperature of approximately 120° cent. and maintaining said solution at said temperature to precipitate said sodium carbonate, and then cooling said solution to crystallize said sodium thiosulphate, and restoring said sodium carbonate to the gas purifying solution from which the spent portion was taken.

In the treatment of gas containing hydrogen sulphide and carbon dioxide with a solution of an alkaline purifying agent such as sodium carbonate, the following reactions occur:

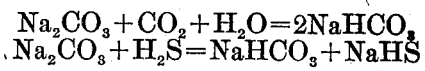

When the resulting solution containing sodium bicarbonate and sodium hydrosulphide together with unchanged sodium carbonate is aerated, part of the sodium hydrosulphide is changed to sodium thiosulphate. The remainder together with part of the sodium bicarbonate is decomposed in accordance with the following reactions:

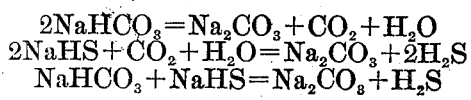

According to the invention, the alkali thiosulphate, in the present instance the sodium thiosulphate, is converted principally into sodium carbonate ($Na_2CO_3$).

Some sodium sulphide ($Na_2S$) may also be formed, but since this, in solution, is readily hydrolized to sodium hydrosulphide (NaHS) and sodium hydroxide (NaOH), it may be returned together with the sodium carbonate to the gas purification process.

A specific application of the invention (referred to as an alternative method in our prior co-pending application referred to above) will now be described.

The process is the same as that described in our co-pending application first referred to, of which this application is a continuation in part, except as to the method of converting the sodium thiosulphate to sodium carbonate. In accordance with the present invention the method of converting the sodium thiosulphate to carbonate is to heat the sodium thiosulphate by itself in a suitable furnace, such as a muffle or reverberatory furnace, to a high temperature. The fused mass is then withdrawn from the furnace, mixed with the carbonaceous material, such as coal, and limestone, and again heated to a high temperature in the furnace, such as 1000° C. This method constitutes an advantage in that, under the action of heat, the sodium thiosulphate is broken up into sodium sulphate and sodium polysulphide (and possibly free sulphur), the mixture of which is more reactive with the calcium carbonate and carbon than is sodium thiosulphate that has not been first so heated. The three materials, the fused mass, the coal and the limestone, are finely divided and intimately mixed while being heated. Suitable proportions are one part of the fused mass resulting from the first heating of the sodium thiosulphate by itself, one and one-half parts limestone and one part carbonaceous material (coal), although the proportions may be varied as found desirable.

During the heating of the mixed materials, the mixture is preferably stirred in any convenient manner. As stated above, the sodium thiosulphate decomposes at a high temperature and these decomposed products react with the coal and limestone, forming principally sodium carbonate although other soluble alkalies, such as sodium sulphide may be formed. Then the fused mass of mixed materials is withdrawn from the furnace and leached with water. The resulting solution contains principally sodium carbonate although other soluble alkalies may be present.

This solution is suitable for use in the gas purification systems. The solution is separated from any carbonaceous material by filtration and returned to the circulating system where it is placed in sufficient amounts to maintain the strength of the circulating solution at the desired percentage of alkalinity.

The invention as hereinabove set forth may be variously embodied within the scope of the claims hereinafter made.

We claim:

1. In a cyclic process for the purification of gases in which the gas is washed by an alkali-metal carbonate solution which passes cyclically back and forth through the gas washing stage and through an aeration stage, the latter involving the formation of alkali-metal thiosulphate in the solution, the improvement characterized by recovering such thiosulphate from the solution, heating the thiosulphate by itself, then heating the mass resulting from said first heating admixed with carbonaceous material and limestone to convert the mass resulting from such first heating to carbonates and restoring the thus recovered carbonates to the gas washing solution and thereby substantially maintaining the solution at the alkalinity required for continuous washing of gases; substantially as specified.

2. A process as claimed in claim 1 in which the alkali-metal carbonate solution is sodium carbonate.

3. In a cyclic process for the purification of gases in which the gas is washed by a sodium carbonate solution which passes cyclically back and forth through the gas washing, stage and through an aeration stage the latter involving the formation of sodium thiosulphate in the solution, the improvement characterized by recovering such thiosulphate from the solution, heating the thiosulphate by itself to form a mass of sodium sulphate and sodium polysulphide (and possibly free sulphur) then heating such mass admixed with coal and limestone to convert said mass of sodium sulphate and sodium polysulphide to carbonates and restoring the thus recovered carbonates to the gas washing solution and thereby substantially maintaining the solution at the alkalinity required for continuous washing of gases; substantially as specified.

4. In the recovery of alkali as alkali-metal-carbonates from gas purification liquors containing alkali-metal thiosulphate, the improvement consisting in recovering said thiosulphate in solid form and heating the recovered thiosulphate first by itself and then heating the mass, resulting from the first heating, admixed with carbonaceous material and limestone to convert the mass to carbonates.

5. The improvement as claimed in claim 4 in which the alkali-metal salts are sodium salts.

6. In the recovery of sodium as sodium carbonate from gas purification liquors containing sodium thiosulphate, the improvement consisting in recovering said sodium thiosulphate and heating the recovered sodium thiosulphat first by itself to form a mass of sodium sulphate and sodium polysulphide (and possibly free sulphur), then heating such mass admixed with coal and limestone to convert said mass of sodium sulphate and sodium polysulphide to carbonates.

7. In the recovery of alkali metal as alkali-metal-carbonates from gas purification liquors containing alkali-metal thiosulphate, the improvement consisting in recovering said thiosulphate in solid form from said liquors and then subjecting the recovered thiosulphate to high temperature furnace heating, and then mixing the resultant fused mass with carbonaceous material and limestone, and subjecting such mixture to a further high temperature furnace heating to convert said mass to carbonates.

8. The method of converting sodium thiosulphate formed in gas purification liquors to sodium carbonate which consists in subjecting the thiosulphate to high temperature furnace heating, and then mixing the resultant fused mass with carbonaceuos material and limestone, and subjecting the mixture to a further high temperature furnace heating to convert the aforesaid mass to sodium carbonate.

In testimony whereof we have hereunto set our hands.

FREDERICK W. SPERR, Jr.
DAVID L. JACOBSON.